ically displays the relation of relative
United States Patent Office 3,651,161
Patented Mar. 21, 1972

3,651,161
PROCESS FOR THE ALKYLATION OF COMPOUNDS HAVING AN ACTIVE HYDROGEN
Toshihiko Waragai, Sagamihara-shi, Hideo Kawaguchi, Chigasaki-shi, and Takeo Saegusa, Kyoto-shi, Japan, assignors to Nippon Oil Company, Limited, Tokyo, Japan
Filed Sept. 2, 1969, Ser. No. 854,602
Claims priority, application Japan, Sept. 30, 1968, 43/70,588, 43/70,589
Int. Cl. C07c 3/12, 3/52
U.S. Cl. 260—671 C          3 Claims

ABSTRACT OF THE DISCLOSURE

The alkylation of compounds having an active hydrogen, allylic or benzylic, in the presence of complex catalysts such as sodium/pyrene and potassium/biphenyl. These catalysts form a charge transfer complex to which the catalyst activity is believably ascribed.

---

This invention relates to the alkylation of compounds having an active hydrogen and has particular reference to a catalytic process in which hydrocarbons having an allylic hydrogen or a benzylic hydrogen are reacted with olefins in the presence of certain charge transfer complexes.

There have hitherto been introduced various processes for the alkylation of olefins employing alkali metal catalysts alone or supported on suitable carriers, together with certain promoters. A typical example was found in U.S. Pat. 2,492,693 which disclosed the use of an alkali metal catalyst and a polynuclear aromatic hydrocarbon promoter for the intermolecular condensation of different monoolefins. However, the polynuclear aromatics for promoting the catalyst (sodium) were recited as including naphthalene, anthracene and acenaphthene, and these were the only specific examples discussed in this patent. Triphenylmethane, indene and fluorene were also recited as such promoters, but their particular usefulness was not made clear.

In the Journal of American Chemical Society publication, vol. 77, pp. 554–559, 1955, the reaction of alkyl aromatic compounds with ethylene was revealed to take place in the presence of sodium catalyst and organic compound promoters consisting of anthracene, ortho-chlorotoluene, ortho-toluic acid, pyridine and organic peroxides.

British Pat. 868,945 disclosed the dimerization of propylene to produce 4-methyl-1-pentene, wherein potassium, rubidium and caesium were used as preferred catalysts and fused-ring, polycyclic aromatic hydrocarbons, acetylenic hydrocarbons, nitrogen-containing heterocyclic compounds and the like as organic promoters. However, only anthracene was accounted for in the example given in this British patent.

Other known prior-art processes for the dimerization or propylene employing potassium as catalyst component were found in U.S. Pat. 3,175,020 which disclosed potassium catalyst as used on alumina carriers; Japanese patent publication 35-14,367 which teaches the use of potassium carbonate as potassium catalyst carriers; Japanese patent publication 40-20,249 on the use of organic lithium catalysts, and British Pats. 912,822 through 912,825, inclusive, on graphite carriers.

Whereas, it is an object of this invention to provide a novel process for the alkylation of olefinic hydrocarbons having an allylic hydrogen, with the use of certain catalysts to produce high conversion to useful alkylates. It is another object to provide a process for the ethylation of alkyl aromatics having a benzylic hydrogen with the use of certain catalysts.

These objects and other features of this invention will be more apparent from the following description rendered in connection with certain specific embodiments.

The present invention has relied upon the discovery that certain compounds having an active hydrogen can be alkylated with high yields in the presence of certain charge transfer complexes. More specifically, it has been found that olefinic hydrocarbons having an allylic hydrogen may be effectively alkylated with ethylene or other olefins in the presence of a sodium/pyrene charge transfer complex or a potassium/biphenyl charge transfer complex. These complex catalysts have been found quite effective also in the alkylation of alkyl aromatics having a benzylic hydrogen. Exhaustive experiments have indicated that the catalyst activity of sodium in the alkylation reaction of the invention varies notably with the choice of aromatic hydrocarbons and such variation is quite regular according to the magnitude of electron affinity, i.e. the order of lowest vacant orbital energies ($E_{LV}=\alpha+m_{n+1}\beta$) of the various aromatic hydrocarbons, a reference being had to the accompanying drawings in which:

FIG. 1 graph conversion rate of toluene (reactant) vs. coefficient of lowest vacant energies of the various aromatic hydrocarbons in the sodium catalyzed reaction of toluene with ethylene;

Figure 1:
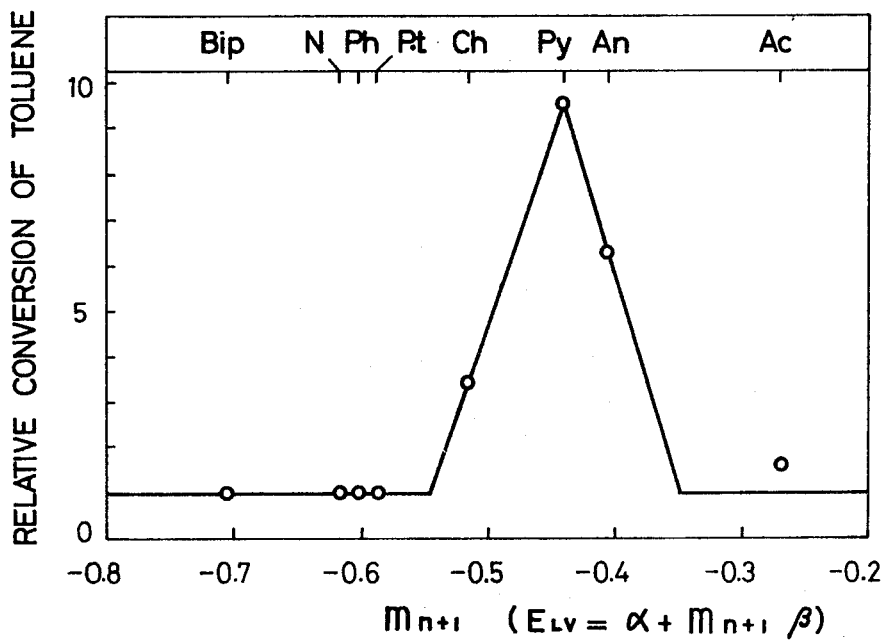
Figure 2:
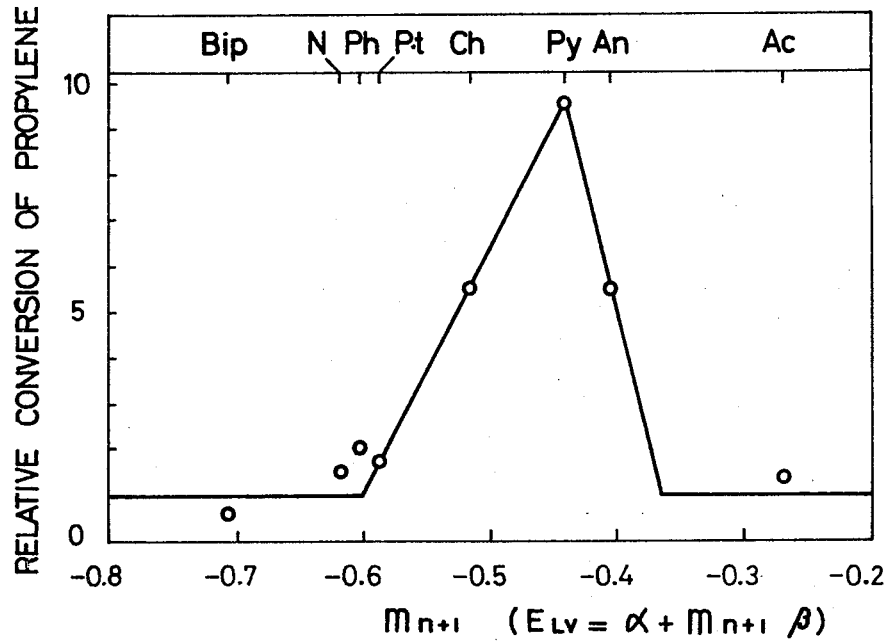
FIG. 2 is a similar graphical display illustrating the reaction of propylene with ethylene in the sodium catalyzed reaction.
Figure 3:
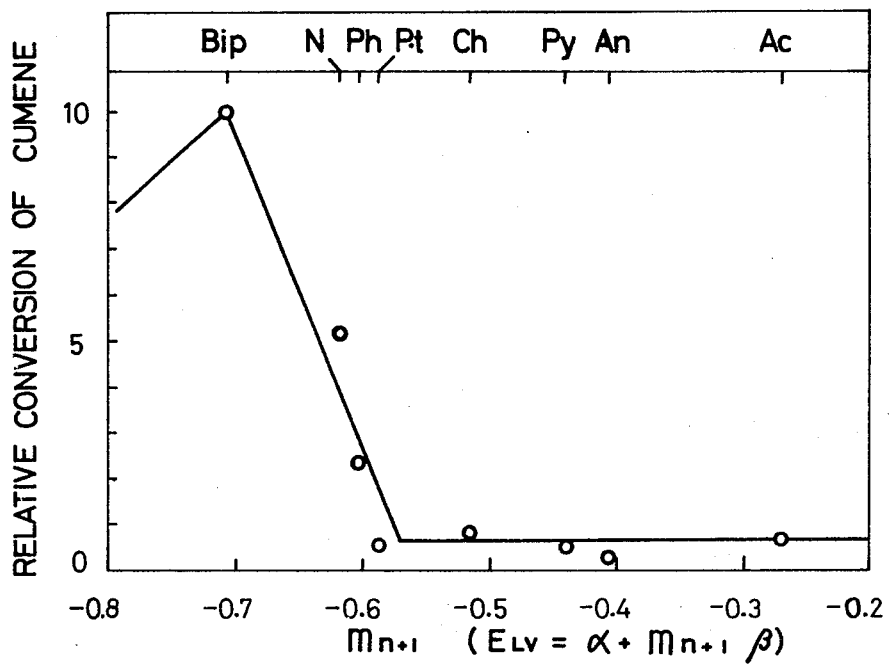
FIG. 3 is another similar graphical display illustrating the case of cumene used as reactant in the potassium catalyzed reaction.
Figure 4:
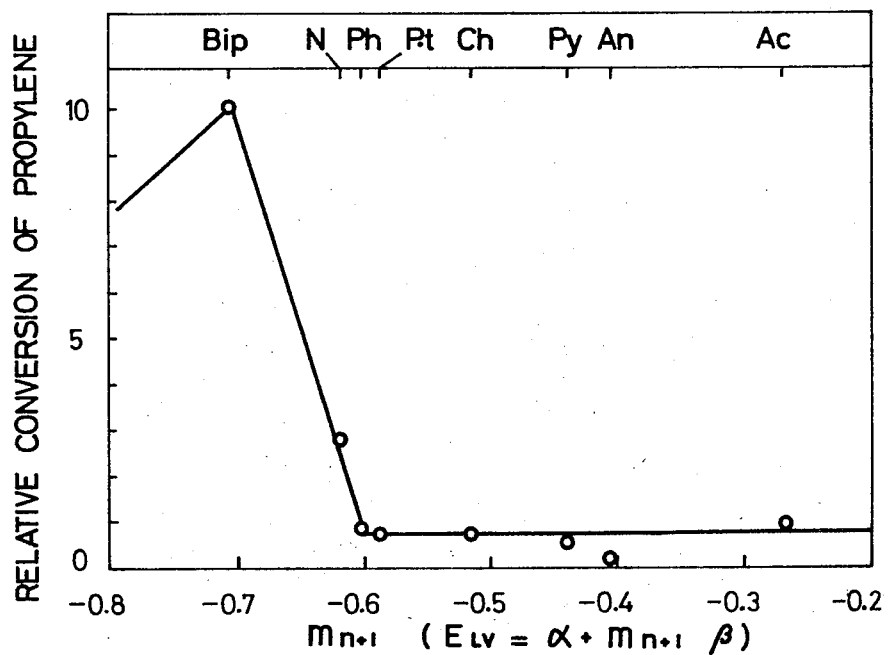
FIG. 4 is a further similar graphical display illustrating the case of propylene used as reactant in the potassium catalyzed reaction.

In these figures, the abbreviation Bip stands for biphenyl, N for naphthalene, Ph for phenanthrene, Pt for para-terphenyl, Ch for chrysene, Py for pyrene, An for anthracene, and Ac for acenaphthylene. It will be noted that the various aromatic hydrocarbons are arranged in the abscissa according to the order of their lowest vacant energies. As shown in FIGS. 1 and 2 and in Tables 1–3 given below, it has been discovered that pyrene amongst the other aromatic hydrocarbons is the most satisfactory to combine with sodium in the catalyst activity desired in the alkylation process of the invention. The most successful aromatic hydrocarbon to combine with the potassium catalyst has been found to be biphenyl which contributes to the production of higher conversions, as shown in FIGS. 3 and 4 and in Tables 4–6 below.

The hydrocarbons defined herein as having an allylic hydrogen may be represented by the general formula:

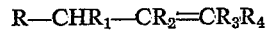

where R, $R_1$, $R_2$, $R_3$ and $R_4$ are hydrogen or certain hydrocarbon radicals. Typical examples of these compounds are monoolefins including propylene, butylene, pentene, octene, hexene, cyclohexene and dodecene, and diolefins including isoprene, hexadiene and cyclooctadiene. The alkyl aromatics having a benzylic hydrogen according to the invention consist of alkylbenzenes such as toluene, xylene, cumene, 2-phenyl butane and dodecylbenzene, methylnaphthalene, isopropylnaphthalene and alkylanthracene.

It is to be noted that the above listed hydrocarbons and alkyl aromatics are characterized by the possession of an allylic hydrogen and a benzylic hydrogen, respectively, and that any compounds lacking these active hydrogens cannot be applied to the process of the invention.

In the alkylation process of the invention employing the above defined compounds having an active hydrogen, allylic or benzylic, as the starting material for reaction with olefinic hydrocarbons in the presence of the specified catalyst components, there may be obtained a highly commercially valuable class of hydrocarbon compounds. For instance, the ethylation of cumene with ethylene as hereinafter exemplified provides ter-amulbenzene; the dimerization of propylene provides methylpentenes; and the reaction of propylene with ethylene provides pentenes. These reactions are believed to reside in the insertion of olefins in between the active hydrogen and the carbon to which the active hydrogen is coupled, as may be understood from the following formula:

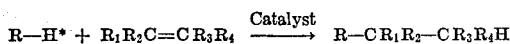

where R—H* is a compound having an active hydrogen, and $R_1R_2C=CR_3R_4$ is an olefinic hydrocarbon wherein $R_1$, $R_2$, $R_3$ and $R_4$ are hydrogen or hydrocarbon radicals.

The catalysts applicable to the process of the invention are charge transfer complexes including sodium/pyrene and potassium/biphenyl. Of these catalyst components, the alkali metal part may be admixed with the corresponding aromatics part prior to charge into the reaction system, or they may be separately charged with similar results. In either case, the sodium or potassium acts as electron donor and the pyrene or biphenyl as electron acceptor thereby forming a peculiar charge transfer complex to which the catalyst activity is believably attributed, thus:

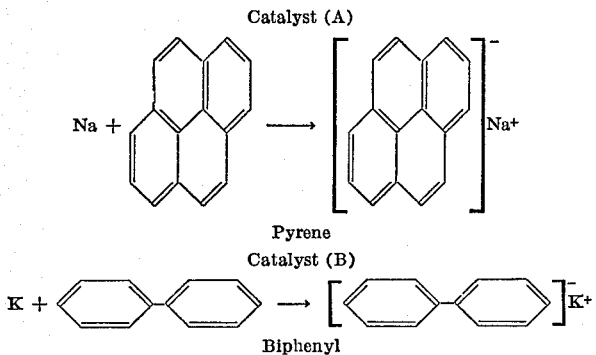

It is not completely known why sodium and potassium act better with pyrene and biphenyl, respectively, than with other promoters. However, repeated experiments have evidenced a peak of the catalyst activity, i.e. alkylation conversion rate (see FIGS. 1 through 4), to lie specifically at pyrene for sodium and biphenyl for potassium amongst the various other aromatic hydrocarbons which were examined under similar reaction conditions and which consisted of naphthalene, phenanthrene, para-terphenyl, chrysene, anthracene and acenaphthylene. These aromatic hydrocarbons or electron acceptors are shown in the drawings and tabulated in the tables below according to the order of lowest vacant orbital energy, from which it is interesting to note that the charge transfer complexes resulting from the combination of the specifically named alkali metal species with the listed aromatic hydrocarbons have a substantial bearing upon the catalyst activity, and the activity of the complex catalyst changes rather regularly according to the acceptors chosen. This invention owes its advantages to the discovery that the combination of sodium and pyrene and that of potassium and biphenyl give the highest catalyst activity in the alkylation reaction.

The acceptor components of the catalysts may be used in amounts as small as 1/100 to 1 mole percent, based on the donor components, i.e. sodium or potassium. These acceptor components are, as previously stated, pyrene and biphenyl, and may be also their derivatives such as alkylpyrene and alkylbiphenyl. The donor catalyst components may be in the form of metallic or hydride and may be applied in solid or dispersion. They may be supported on suitable inert carriers such as sodium carbonate and sodium oxide (for the sodium donor) and potassium carbonate and potassium oxide (for the potassium donor). Suitable inert porous materials and the like which may not seriously effect the state of electrons of the donor components may also be used as such carriers.

The alkylation reaction according to the invention may be carried out with or without the presence of solvents. These solvents should preferably be inert to the catalysts and may suitably be heptane, dodecane, cetane, Decalin, Nujol and similar saturated hydrocarbons.

The process of the invention may be carried out at temperatures in the range of 100° to 350° C., preferably 180° to 280° C. and under normal or elevated pressures. It may employ either a batch or continuous mode of operation.

The following examples illustrate the alkylation process of this invention conducted under preferred conditions.

EXAMPLE I 20 cc. of toluene, 0.03 g. atom of sodium metal and 3 mmoles of each of the various aromatic hydrocarbons consisting of biphenyl, naphthalene, phenanthrene, para-terphenyl, chrysene, pyrene, anthracene and acenaphthylene were charged into a nitrogen purged stainless steel pressure tube of 50 cc. capacity. Ethylene was compressed up to 60 atmospheres and admitted at room temperature into this tube. Then, the tube was closed and heated at 255° C. for 3.5 hours.

The reaction products were analyzed by gas chromatography to reveal a relative conversion of toluene as shown in Table 1 against the various aromatic hydrocarbons which took part in the formation of charge transfer complexes with the sodium metal.

TABLE 1

Aromatic hydrocarbons
(acceptors): Ethylation of toluene (percent)
- Biphenyl (Bip) ---- 7
- Naphthalene (N) ---- 7
- Phenanthrene (Ph) ---- 7
- Para-terphenyl (Pt) ---- 7
- Chrysene (Ch) ---- 24
- Pyrene (Py) ---- 68
- Anthracene (An) ---- 48
- Acenaphthylene (Ac) ---- 11
- None ---- 7

It was thus ascertained that with these aromatic hydrocarbons tabulated in the order of Energy of Lowest Vacant Orbital, the relative conversion rate of toluene was greatest at pyrene, as seen in FIG. 1. This indicated that the catalyst combination of sodium and pyrene amongst other combinations was most satisfactory in the ethylation of toluene.

EXAMPLE II 45 cc. of cumene, 0.058 g. atom of sodium metal and 3 mmoles of pyrene were charged into a nitrogen purged, 100 cc. autoclave equipped with an electromagnetic agitator. Ethylene was injected to a pressure of 80 atmospheres at room temperature, and the autoclave heated at 250° C. for a period of 2 hours. The reaction products were gas-chromatographically analyzed, with the result that 78% of ter-amylbenzene was obtained.

EXAMPLE III 25 cc. of ethylbenzene, 0.025 g. atom of sodium metal and 2 mmoles of each of the various aromatic hydrocarbon species listed in Table 2 were introduced into a nitrogen purged, 50 cc. pressure tube. Ethylene was injected to a pressure of about 58 atmospheres at room temperature, and the tube heated at 250° C. for 3 hours. Gas chromatography showed the relative conversions of ethylbenzene as tabulated in Table 2 below.

TABLE 2

| Aromatic hydrocarbons (acceptors): | Relative conversion of ethylbenzene (percent) |
|---|---|
| Biphenyl (Bip) | 8 |
| Naphthalene (N) | 8 |
| Phenanthrene (Ph) | 11 |
| Para-terphenyl (Pt) | 12 |
| Chrysene (Ch) | 25 |
| Pyrene (Py) | 41 |
| Anthracene (An) | 28 |
| Acenaphthylene (Ac) | 17 |
| None | 8 |

As apparent from the above table, pyrene was found to be the best partner for sodium to give a catalyst activity considerably higher than obtainable with any other acceptor/sodium combinations.

EXAMPLE IV 0.03 g. atom of sodium metal and 3 mmoles of each of the various aromatic hydrocarbons (acceptors) were charged into a 50 cc. pressure tube. 10 cc. of cetane were added, followed by the introduction of 0.16 mole of propylene at reduced temperature. Ethylene was then injected to a pressure of 60 atmospheres at room temperature, and the tube heated at 255° C. for 2 hours. The reaction products were analyzed by gas chromatography, in which the ethylation of propylene was obtained by percent based on the quantity of the resulting pentene-1 as shown in Table 3.

TABLE 3

| Aromatic hydrocarbons (acceptors): | Ethylation of propylene (percent) |
|---|---|
| Biphenyl (Bip) | 2 |
| Naphthalene (N) | 2 |
| Phenanthrene (Ph) | 6 |
| Para-terphenyl (Pt) | 5 |
| Chrysene (Ch) | 15 |
| Pyrene (Py) | 27 |
| Anthracene (An) | 15 |
| Acenaphthylene (Ac) | 8 |
| None | 1 |

In this example, too, pyrene gave better results than the other acceptors, as shown in FIG. 2.

EXAMPLE V 0.05 g. atom of sodium metal, 2.5 mmoles of pyrene and 20 cc. of n-heptane were charged into a nitrogen purged, 100 cc. autoclave equipped with an electromagnetic agitator. 0.66 mole of propylene was admitted under pressure, and the autoclave heated at 250° C. for 6 hours. There were obtained 8.2 g. of $C_6$ olefins consisting predominantly of methylpentene.

EXAMPLE VI 100 cc. of cumene, 0.13 g. atom of sodium hydride and 15 mmoles of pyrene were charged into a stainless steel autoclave of 250 cc. capacity and provided with an electromagnetic agitator. Ethylene was injected to a pressure of 60 atmospheres at room temperature, and the autoclave heated to 250° C. for 3 hours. There was obtained 58% ter-amylbenzene with excellent selectivity.

The foregoing examples have dealt with the alkylation reaction in which sodium is used as catalyst in combination with the various aromatic hydrocarbons, and have proven that the sodium/pyrene complex shows the outstanding catalyst activity. The following examples are now presented to demonstrate the fact that potassium, as a part of another preferred catalyst component, co-acts peculiarly with biphenyl amongst the several other acceptor species which are the same as discussed in the previous examples except for the addition of benzene in Example VII.

EXAMPLE VII 20 cc. of cumene, 0.03 g. atom of potassium metal and 3 mmoles of each of the various aromatic hydrocarbons listed in Table 4 were charged into a nitrogen purged, 50 cc. stainless steel pressure tube, followed by the injection of ethylene to a pressure of about 60 atmospheres at room temperature. The reaction was continued at 220° C. for a period of 1.5 hours. The reaction products were analyzed by gas chromatography to reveal such relative conversions of cumene as shown in Table 4, from which it will be noted that the yields are highest where potassium is used in combination with biphenyl (FIG. 3).

TABLE 4

| Aromatic hydrocarbons (acceptors): | Ethylation of cumene (percent) |
|---|---|
| Benzene | 2 |
| Biphenyl (Bip) | 22 |
| Naphthalene (N) | 10 |
| Phenanthrene (Ph) | 4 |
| Para-terphenyl (Pt) | 1.5 |
| Chrysene (Ch) | 1 |
| Pyrene (Py) | 1 |
| Anthracene (An) | 1 |
| Acenaphthylene (Ac) | 1 |
| None | 2 |

EXAMPLE VIII 0.03 g. atom of potassium metal and 3 mmoles of each of the aromatic hydrocarbons tabulated in Table 5 were charged into a 50 cc. pressure tube. 10 ml. of cetane were also added as solvent. 0.16 mole of propylene was then charged at reduced temperature, and ethylene injected to a pressure of 60 atmospheres at room temperature. The tube was heated at 220° C. for 1 hour. The resulting product consisted predominantly of pentene-1. In this example also, the potassium/biphenyl combination catalyst was found exceptionally effective, as apparent from Table 5 below.

TABLE 5

| Aromatic hydrocarbons (acceptors): | Ethylation of propylene (percent) |
|---|---|
| Biphenyl (Bip) | 20.2 |
| Naphthalene (N) | 3.7 |
| Phenanthrene (Ph) | 1.3 |
| Para-terphenyl (Pt) | 2.7 |
| Chrysene (Ch) | 1.6 |
| Pyrene (Py) | 0.2 |
| Anthracene (An) | 0.1 |
| Acenaphthylene (Ac) | 3.0 |
| None | 3.4 |

EXAMPLE IX 0.092 g. atom of potassium metal, 8 mmoles of biphenyl and 100 cc. of Nujol (solvent) were charged into a nitrogen purged, 250 cc. autoclave provided with an electromagnetic agitator. 1.7 moles of propylene were admitted under pressure, and the autoclave was heated at 204° C. for 1.5 hours. The pressure rose to 152 atmospheres maximum. The dimerization product was hexen isomer consisting of 80.5% of 4-methylpentene-1, 15.2% of 4-methylpentene-2, 2.8% of 2-methylpentene-1 and n-hexene-1, and 1.5% of 2-methylpenten-2 and n-hexene-2.

EXAMPLE X

A charge consisting of 0.1 g. atom of potassium metal, 5 mmoles of biphenyl and 60 cc. of n-heptane (solvent) was used with the injection of 1.5 moles of propylene. The whole was heated at 182° C. for 2 hours, and the pressure rose to a maximum of 92 atmospheres. There was obtained 20% hexene isomer which contained 79.3% 4-methylpentene-1.

EXAMPLE XI 0.06 g. atom of potassium metal, 3 mmoles of biphenyl and 20 cc. of n-heptane (solvent) were charged into a nitrogen purged, 100 cc. autoclave equipped with an electromagnetic agitator. 0.82 mole of propylene was then introduced at reduced temperature. The reaction was continued at a temperature of 175° C. for a period of about 2.5 hours. The pressure increased to 118 atmospheres maximum. There was obtained a yield of 22.4% hexene isomer. The composition of the isomer was gas-chromatographically analyzed to reveal 78.5% 4-methylpentene-1, 12.3% 4-methylpentene-2, 6.3% 2-methylpentene-1 and n-hexene-1, and 2.9% 2-methylpentene-2 and n-hexene-2.

EXAMPLE XII 4.5 grams of a donor-part catalyst consisting of 8 grams of potassium metal as supported on 40 grams of vacuum dried potassium carbonate, 2 mmoles of biphenyl and 20 cc. of cetane were charged into a 100 cc. autoclave provided with an electromagnetic agitator. 0.82 mole of propylene was then introduced at reduced temperature, and the autoclave heated at 180° C. for 1 hour and 10 minutes, during which time the autoclave pressure rose to a maximum of 124 atmospheres. There was obtained a yield of 3.3 grams of hexene isomer containing 82.1% 4-methylpentene-1.

EXAMPLE XIII 2.5 grams of a donor-part catalyst consisting of 5 grams of potassium metal as supported on 20 grams of vacuum dried potassium carbonate, 2 mmoles of each of the aromatic hydrocarbons listed in Table 6 and 10 cc. of n-heptane (solvent) were charged into a 50 cc. pressure tube. 0.36 mole of propylene was admitted under pressure, and the tube heated at 194° C. for 1.5 hours. The reaction products were analyzed by gas chromatography. The conversions of propylene to dimers are tabulated below.

TABLE 6

| Aromatic hydrocarbons (acceptors): | Dimerization of propylene (percent) |
|---|---|
| Biphenyl (Bip) | 14.2 |
| Naphthalene (N) | 4.2 |
| Phenanthrene (Ph) | 1.3 |
| Para-terphenyl (Pt) | 1.1 |
| Chrysene (Ch) | 1.1 |
| Pyrene (Py) | 0.7 |
| Anthracene (An) | 0.3 |
| Acenaphthylene (Ac) | 1.2 |
| None | 1.4 |

The acceptor biphenyl thus gave exceptionally good results in the dimerization of propylene, as may be seen from FIG. 4.

What is claimed is:

1. Alkylation process which comprises reacting an olefinic hydrocarbon with a hydrocarbon having an allylic hydrogen or a benzylic hydrogen in the presence of a charge transfer complex selected from the group consisting of a sodium/pyrene complex and a potassium/biphenyl complex at temperatures ranging from 100° to 350° C.

2. Process as claimed in claim 1 wherein said hydrocarbon is one having an allylic hydrogen and is selected from the group consisting of propylene, butylene, pentene, octene, hexene, cyclohexene, dodecene, isoprene, hexadiene and cyclooctadiene.

3. Process as claimed in claim 1 wherein said hydrocarbon is one having benzylic hydrogen and is selected from the group consisting of toluene, xylene, cumene, 2-phenyl butane, dodecylbenzene, methylnaphthalene, isopropylnaphthalene and alkylanthracene.

References Cited

UNITED STATES PATENTS 2,721,886 10/1955 Pines et al. _____ 260—668 B
2,758,140 8/1956 Ipatieff et al. _____ 260—668 B CURTIS R. DAVIS, Primary Examiner U.S. Cl. X.R.

260—668 B, 680, 683.15 E